(12) United States Patent
Konigsberg et al.

(10) Patent No.: US 8,833,310 B2
(45) Date of Patent: Sep. 16, 2014

(54) TETHER DEVICE, SYSTEM, AND METHOD

(75) Inventors: Jeff Konigsberg, Armonk, NY (US); Joan Lunden, Armonk, NY (US)

(73) Assignee: Kinderkord, LLC, Armonk, NY (US)

( * ) Notice: Subject to any disclaimer, the term of this patent is extended or adjusted under 35 U.S.C. 154(b) by 860 days.

(21) Appl. No.: 11/534,973

(22) Filed: Sep. 25, 2006

(65) Prior Publication Data

US 2008/0072844 A1 Mar. 27, 2008

(51) Int. Cl.
*A01K 27/00* (2006.01)
*A47D 13/08* (2006.01)

(52) U.S. Cl.
USPC ............... 119/770; 119/794; 119/796; 70/16; 128/878

(58) Field of Classification Search
USPC ......... 119/770, 792, 793, 794, 795, 796, 797, 119/856, 857; 70/14, 16, 18, 19; 128/869, 128/876, 878, 879; 602/21, 22; 482/92, 482/105, 121–125, 138, 139, 148
See application file for complete search history.

(56) References Cited

U.S. PATENT DOCUMENTS

| | | | |
|---|---|---|---|
| 2,994,300 A | 8/1961 | Grahling | |
| 4,328,761 A | 5/1982 | Dwyer | |
| 4,688,564 A | 8/1987 | Kelly | |
| 4,745,883 A | 5/1988 | Baggetta | |
| 4,751,896 A | 6/1988 | Miley | |
| 4,765,279 A | 8/1988 | Klickstein | |
| 4,964,370 A | 10/1990 | Peterson | |
| 5,345,610 A | 9/1994 | Belanger | |
| 5,358,461 A * | 10/1994 | Bailey, Jr. | 482/2 |
| 5,595,143 A * | 1/1997 | Alberti | 119/794 |
| 5,638,772 A * | 6/1997 | Kaufmann et al. | 119/770 |
| 5,704,856 A * | 1/1998 | Morse | 473/422 |
| 5,803,017 A * | 9/1998 | Stewart | 119/799 |
| 6,026,661 A | 2/2000 | Spiropoulos | |
| 6,095,936 A * | 8/2000 | Kirkpatrick et al. | 473/450 |
| 6,405,683 B1 | 6/2002 | Walter et al. | |
| 6,866,128 B2 | 3/2005 | Moore et al. | |
| 6,938,275 B1 * | 9/2005 | Fried | 2/162 |
| 7,402,147 B1 * | 7/2008 | Allen | 602/20 |
| 7,563,212 B2 * | 7/2009 | Smith | 482/124 |
| 2005/0077329 A1 | 4/2005 | Sconzo | |
| 2009/0255486 A1 * | 10/2009 | Thompson et al. | 119/794 |
| 2012/0234260 A1 * | 9/2012 | Shaw et al. | 119/770 |

\* cited by examiner

*Primary Examiner* — Joseph W Sanderson
(74) *Attorney, Agent, or Firm* — Whyte Hirschboeck Dudek S.C.

(57) ABSTRACT

A tether device is provided which includes a first wristband to which a retracting mechanism is attached. A first end of a cord may be attached to the retracting mechanism. A second end of the cord may be attached to a second band. The retracting mechanism permits retraction and extension of the cord between the first and second wristbands responsive to changes in distance between first and second persons wearing the respective first and second wristbands. The present tether device provides an effective, lightweight tether system that may be used by an adult for inconspicuous, hands-free restraint of a child, particularly in public areas.

13 Claims, 4 Drawing Sheets

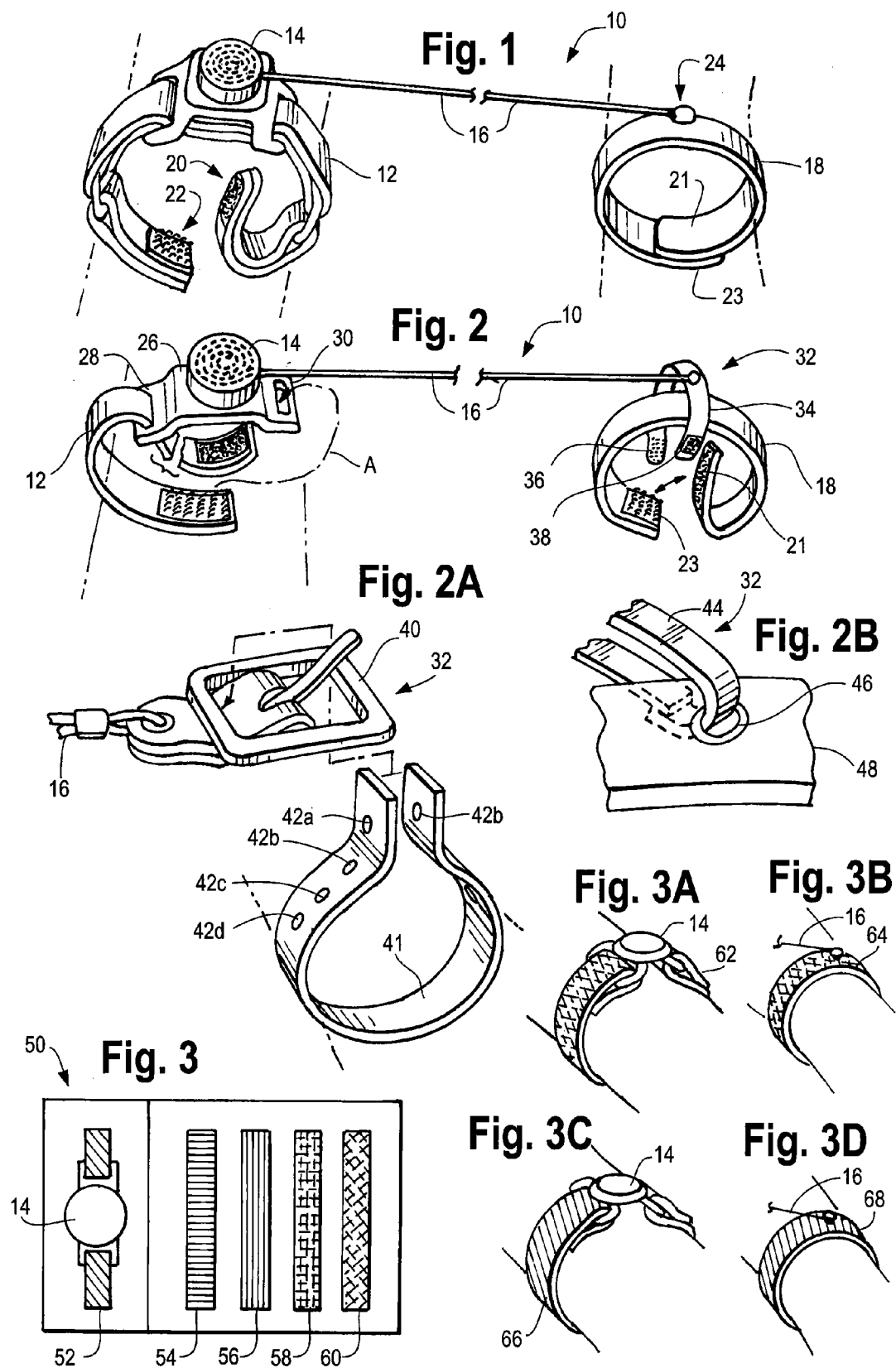

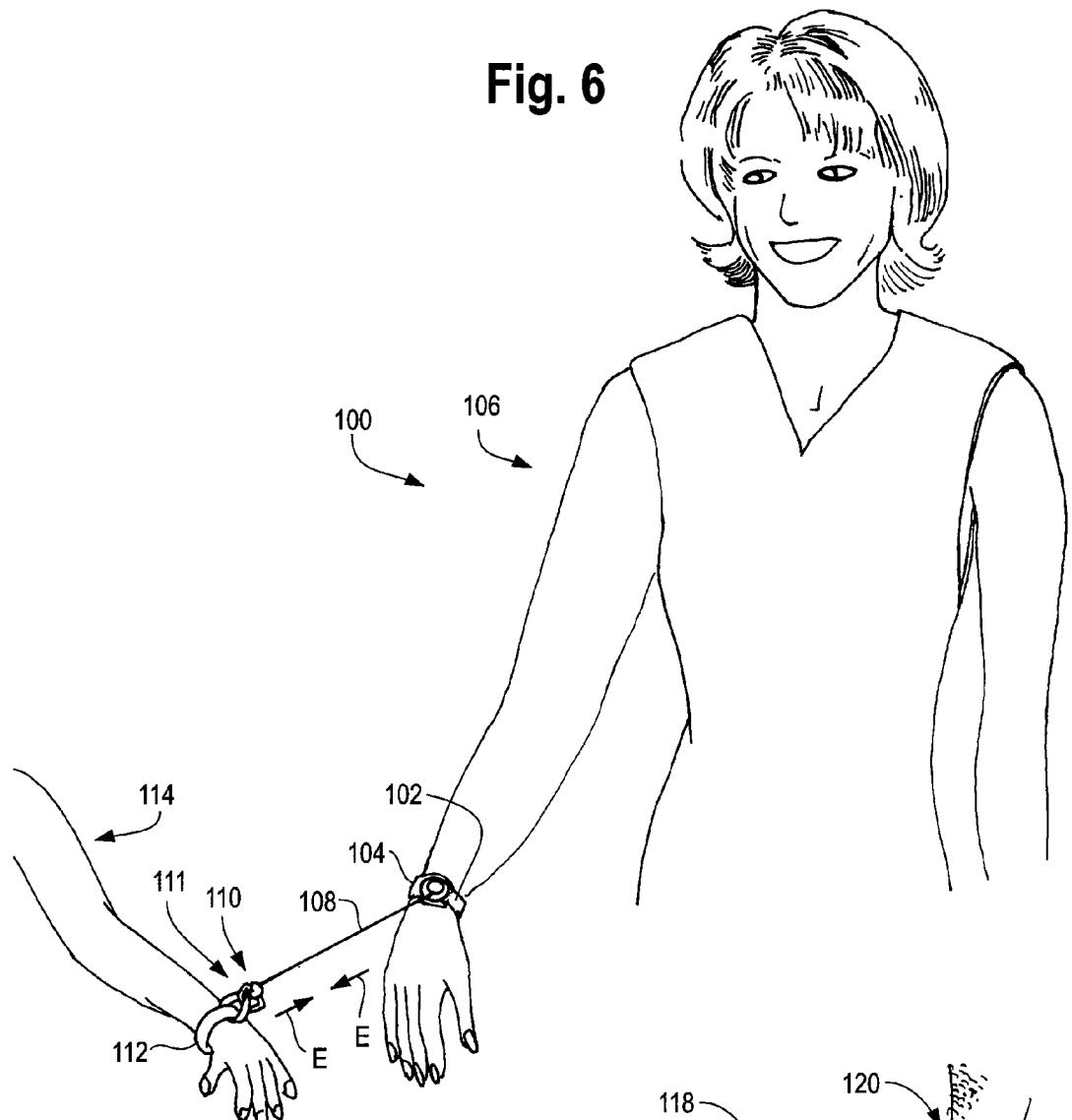
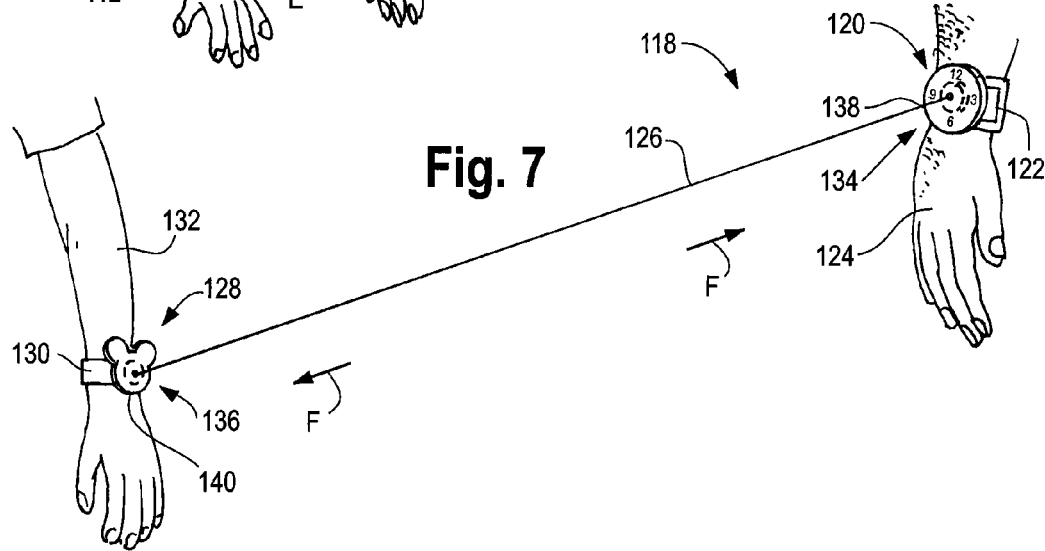

TETHER DEVICE, SYSTEM, AND METHOD

BACKGROUND

Any parent or caretaker will immediately appreciate the difficulties and challenges that arise when taking a small child to a public place. Parents carry a perpetual fear of losing their child in public places. Child supervision is particularly troublesome in crowded and congested public areas such as transportation terminals (airport, train depot, bus depot), zoos, circuses, amusement parks, stores, and malls. A parent's fear of losing a child in these places makes public excursions events to dread rather than experiences to anticipate.

Known are child restraining devices such as harness and tethers. Each of these has shortcomings. Harnesses typically require one or both of the caretaker's hands to guide and restrain the child. This restricts the caretaker's ability to tend to other matters that require the use of one's hands. In addition, child harnesses carry a negative social stigma. Child harnesses are often viewed by onlookers (and other parents or caretakers in particular) as overly restrictive and repressive. The use of such harnesses are often perceived as degrading to the child. Other known tethers have extendible lines between the adult and child, the lines having a minimum length. These tethers are problematic as the slack of these tethers tends to catch on objects. The child is easily entangled in the slack, and the dragging slack dirties both the harness and the child.

A need exists for an effective, hands-free tether device to safely maintain a child in close proximity with a caretaker in public areas. A need further exists for a tether device that eliminates the problems associated with tether slack.

SUMMARY

The present disclosure provides an effective, lightweight, readily attachable tether device and system that may be used to maintain a physical connection between two persons, particularly in public areas. The present tether device also provides hands-free restraint between two persons, such as an adult and a child. The present tether device includes a first band to which a retracting mechanism is attached. A first end of a cord may be attached to the retracting mechanism. A second end of the cord may be attached to a second band. The retracting mechanism permits retraction and extension of the cord between the first and second bands in response to changes in distance between the first and second wristbands. In an embodiment, the first and second bands may be wristbands.

The retracting mechanism may be permanently or releasably attached to the first wristband. Similarly, the second end of the cord may be permanently or releasably attached to the second wristband. In an embodiment, the retracting mechanism may be releasably attached to the first wristband. Similarly, the second end of the cord may include a fastening device that permits the cord to be releasably attachable to the second wristband.

In an embodiment, the first wristband and/or the second wristband may be interchangeable with an alternate wristband. The alternate wristband may have a feature that is different than a feature of the first wristband. The feature of the alternate wristband may be a color, size, shape, length, material, and/or a visual appearance that is different than the first wristband.

In an embodiment, the retracting mechanism may be configured to permit the cord to have full 360° range of motion with respect to the retracting mechanism. In one embodiment, the retracting mechanism may be rotatable about a central post that attaches the retracting mechanism to an attachment member, the attachment member securing the retracting mechanism to the wristband. In a further embodiment, the retracting member may include a cord opening that is present on an upper front face or upper surface of the retracting mechanism. The cord opening may be parallel to an axis that is perpendicular an outer surface of the wristband. The cord may be moveable through a 360° range of motion about the cord opening.

In an embodiment, the tether device may include a housing that may be disposed or otherwise located on, around, or adjacent to the retracting mechanism. The housing may also be attached to the wristband. The housing may include an aesthetically appealing or functional ornament such as a watch, a toy, a video game, jewelry, an appealing design, or the shape of a cartoon character or action figure.

In an embodiment, a tether system is provided. The tether system may include a first wristband secured to a first person's wrist and a second wristband secured to a second person's wrist. The retracting mechanism may be attached to either wristband. In an embodiment, the retracting mechanism may be attached to the first wristband. A first end of the cord may be in operative communication with the retracting mechanism. A second end of the cord may be attached to the second wristband. The retracting mechanism may retract and extend the cord in response to changes in distance between the first person and the second person. The first and second persons may be adults, children, and combinations thereof. The wristband may be worn so that the retracting mechanism is located adjacent to an outer, upper surface of the wrist.

In an embodiment, the system may include a cord with a first end attached to a first retracting mechanism and a second end attached to a second retracting mechanism. The first retracting mechanism may be attached to a first wristband and the second retracting mechanism may be attached to a second wristband, the first and second wristbands being worn by first and second persons. The first and second retracting mechanism may provide retraction and extension of the cord responsive to changes in the distance between the first and second persons.

A tethering method is provided in a further embodiment. The tethering method includes securing a first wristband around a first person's wrist. Attached to the first wristband may be a retracting mechanism. A first end of a cord may be in operative communication with the retracting mechanism. A second end of the cord may be attached to a second wristband. The method may further entail securing the second wristband to the wrist of a second person, and tethering the first person to the second person. The retracting mechanism may retract or extend the cord responsive to changes in distance between the first and second persons. The first and second persons may be adults, children, or combinations thereof.

In an embodiment, the retracting mechanism may be releasably attached to the first wristband. The method may include removing the retracting mechanism from the first wristband and attaching the retracting mechanism to an alternate wristband. The method may further include selecting the alternate wristband based on a feature of the alternate wristband selected from the group consisting of color, size, shape, length, material, visual appearance, and combinations thereof.

In an embodiment, the method may further include securing a third wristband to a wrist of either the first or second person. A second retracting mechanism may be attached to the third wristband. A first end of a second cord may be attached to the second retracting mechanism. A second end of the second cord may be attached to a fourth wristband. The method may further entail securing the fourth wristband to the wrist of a third person, and tethering either the first or second person to the third person. The third person may be a child or an adult.

An advantage of the present tether device is that it provides a hands-free tether or connection between persons wearing the wristbands. The tether device is small, lightweight, unobtrusive and hardly noticeable when the cord is extended. The present tether device enables either person to utilize his or her hands while maintaining a constant physical line connection between the persons. When tethered first and second persons (i.e., adult and child) proceed in a hand-in-hand fashion, the retracting mechanism retracts the cord, eliminating line slack and the problems (entanglement, dirt) associated with tether devices having a minimum tether length. When first and second persons are hand-in-hand, the tether device is hardly noticeable, its presence virtually undetectable, concealed to onlookers by way of the wristbands. The present tether device finds a practical balance between a parent's concern for child safety in public places with the negative perception carried by child restraining devices. Although the present disclosure is directed to a tether device used between two or more persons, it is understood that the present tether device may be used to safely restrain pets, and objects such as luggage, purses, and/or briefcases.

Additional features and advantages are described herein, and will be apparent from, the following Detailed Description and the Figures.

BRIEF DESCRIPTION OF THE FIGURES

FIG. 1 is a perspective view of a tether device in accordance with the present disclosure.

FIG. 2 is a perspective view of a tether device in accordance with an embodiment of the present disclosure.

FIG. 2A is an enlarged fragmentary perspective view of a fastener in accordance with an embodiment of the present disclosure.

FIG. 2B is an enlarged fragmentary perspective view of a fastener in accordance with an embodiment of the present disclosure.

FIG. 3 is a plan view of a kit having a wristband and retracting mechanism and plurality of alternate wristbands in accordance with an embodiment of the present disclosure.

FIGS. 3A and 3B are fragmentary perspective views of alternate wristbands, the alternate wristbands on the wrists of respective first and second persons in accordance with an embodiment of the present disclosure.

FIGS. 3C and 3D are fragmentary perspective views alternate wristbands, the alternate wristbands on the wrists of respective first and second persons in accordance with an embodiment of the present disclosure.

FIG. 6 is a perspective view of a tether system in accordance with an embodiment of the present disclosure.

FIG. 7 is a perspective view of a tether system in accordance with an embodiment of the present disclosure.

DETAILED DESCRIPTION

Figure 4:
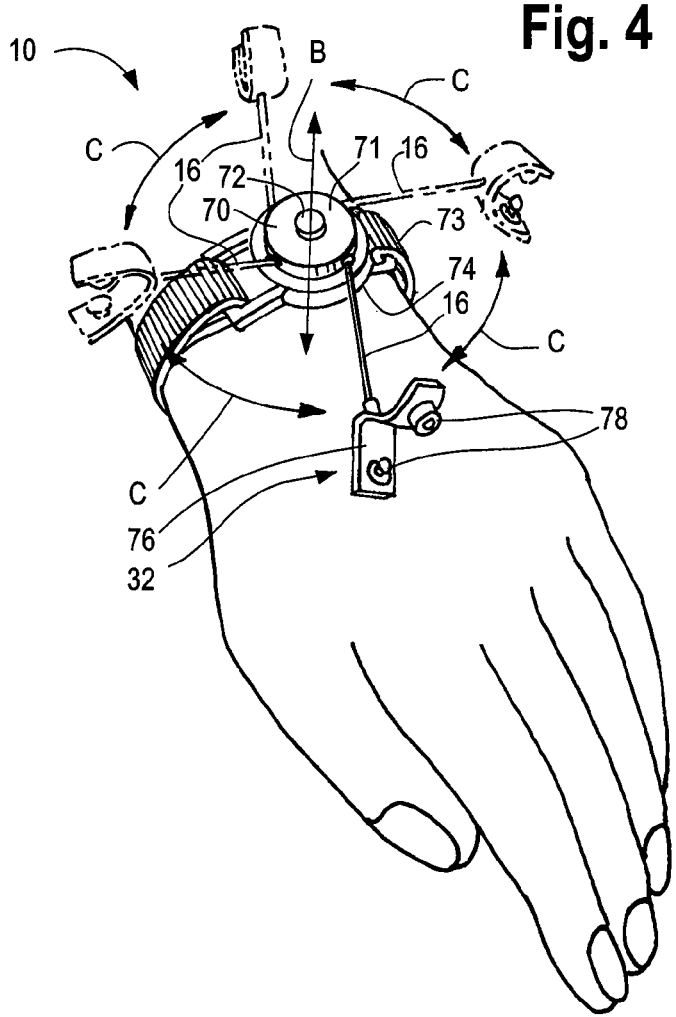
FIG. 4 is perspective view of a wristband and a rotatable retracting mechanism in accordance with an embodiment of the present disclosure.

Referring to the Figures generally, where like reference numerals denote like structure and elements, and in particular to FIG. 1, a tether device 10 is shown. Tether device 10 includes a first band 12, a retracting mechanism 14, a cord 16, and a second band 18. Non-limiting examples of bands 12 and 18 include wristbands, armbands, bands attachable to belts, or bands attachable to belt loops. Bands 12 and 18 and may be the same or different. In an embodiment, bands 12 and 18 are the same or substantially the same or similar. In a further embodiment, bands 12 and 18 may be wristbands. Consequently, one of ordinary skill in the art will appreciate that the following description of wristband 12 may be applied to wristband 18. The skilled artisan will further understand that the following description of wristbands may apply equally to any of the aforementioned bands.

First wristband 12 may be made of any flexible material suitable for extending around a person's arm or wrist with sufficient durability to supporting retracting mechanism 14 as is commonly known in the art. Nonlimiting examples of suitable materials for wristbands 12 and 18 include fabric, leather or similar tanned animal skin, textile material, cloth, polymeric material, polymer mesh, nylon webbing, polypropylene webbing, nylike webbing, and combinations thereof. The length of either wristband 12 or 18 may be adjusted or varied as desired in order to extend or otherwise wrap around the arm and/or the wrist of a person. For example, the length of wristband 12 or 18 may be adjusted as desired to accommodate the arm and/or wrist of persons of varying sizes—i.e., persons such as adults or children. In an embodiment one or both wristbands 12, 18 may include padding for added comfort during wear.

Ends 20, 22 of wristband 12 (ends 24, 26 of second wristband 18) may be adapted to secure, fasten, or otherwise attach to each other in order to form a closed loop around a person's wrist or arm as is commonly known in the art. In an embodiment, end 20 may include a fastening member and end 22 may include a reciprocal fastening member that operates in cooperation with the fastening member providing releasable attachment between ends 20 and 22. Nonlimiting examples of suitable fastening members/reciprocal fastening members may include loop and hook material (VELCRO®), a button and a slot, a tongue and a slot, a snap and a snap base, a zipper, a belt and a buckle, a male-female fastener, a tongue and groove fastener, and combinations thereof. In an embodiment, fastening member/reciprocal fastening member on ends 20, 22 may be hook and loop material as shown in FIGS. 1 and 2. Wristbands 12, 18 advantageously extend around the entire circumference of a person's arm or wrist. This is advantageous when compared to conventional retractable pet leashes, for example. These pet leashes typically entail a hand loop that does not snugly fit or secure around the wrist. Such leashes typically require guidance and/or manipulation of the leash by the hand of the person. The present wristband arrangement, however, provides a hands-free tethering device. Securement of bands around the wrist enable a person using device 10 to utilize one or both hands when necessary and still maintain a tether or a physical connection to a second person when either person is using his or her hands.

In an embodiment, one or both wristbands 12, 18 may be a closed loop, the wristband made of a resilient or otherwise elastic, or stretchable material. The closed loop wristband may be stretched over the hand in order to be placed, secured, and worn around the person's wrist. Nonlimiting examples of suitable resilient materials include natural or synthetic rubber or an elastic, thermoplastic, or polymeric material. In this embodiment, one or both wristbands 12, 18 may lack releasably attachable ends, or may otherwise be fastener free.

Retracting mechanism 14 may be attached or otherwise secured to first wristband 12 as shown in FIG. 1. It is understood that retracting mechanism 14 may be attached to either first wristband 12 or second wristband 18 as desired. A first end of cord 16 (not shown) is secured, attached or otherwise operatively connected to retracting mechanism 14. A second end 24 of cord 16 may be adapted to attach, fasten, or secure to second wristband 18 as will be discussed in detail below.

In an embodiment, retracting mechanism 14 maintains a biasing force upon cord 16. The biasing force causes cord 16 to retract as slack in the cord develops. This provides a constant tension upon cord 16. The biasing force also permits cord 16 to extend or otherwise lengthen when a pulling force greater than the biasing force is exerted upon cord 16. One of ordinary skill in the art will appreciate that cord retraction may occur when the distance between first wristband 12 and second wristband 18 decreases, diminishes or otherwise shortens. Alternatively, cord extension may occur when the distance between first and second wristbands 12 and 18 increases. Retracting mechanism 14 thereby permits retraction and extension of cord 16 between first and second wristbands 12, 18. Cord retraction and extension is responsive to changes in the distance between first wristband 12 and second wristband 18.

In an embodiment, retracting mechanism 14 may include a spool assembly that may be spring biased to retract cord 16. The spool assembly may be configured to provide a constant biasing force in order to wind up, rewind, wrap, spool, or otherwise coil cord 16 upon the spool assembly. The biasing force may be invariable (constant) or variable (graduated). An invariable biasing force maintains a constant tension upon cord 16 regardless of the degree of cord extension. A variable or graduated biasing force exerts a gradually increasing tension upon the cord as the length of cord extending from the retracting mechanism increases. Alternatively, retracting mechanism 14 may be configured to provide a variable biasing force whereby the tension upon the cord is greatest when cord 16 is fully retracted, the biasing force gradually decreasing as the cord extends (cord length increases) from the retracting mechanism.

In an embodiment, retracting mechanism 14 may be releasably attached to first wristband 12 (or second wristband 18) as shown in FIG. 2. Retracting mechanism 14 may include an attachment member 26 that permits releasable attachment between retracting mechanism 14 and first wristband 12 as is commonly known in the art. Attachment member 26 may or may not be integral to retracting mechanism 14. Releasable attachment permits retracting mechanism 14 to be removed, placed, and/or replaced on wristband 12 (or wristband 18). Non-limiting examples of suitable releasable attachment configurations between attachment member 26 and the wristband include loop and hook material (VELCRO®), a button and a slot, a tongue and a slot, a snap and a snap base, a zipper, a belt and a buckle, a male-female fastener, a loop fastener, a tongue and groove fastener, and combinations thereof. In an embodiment, attachment member 26 may include slots 28, 30 through which either end 20 or end 22 may pass. Once wristband 12 is slid or otherwise extended through slots 28 and 30 (as shown by curved arrow A of FIG. 2), ends 20 and 22 may be wrapped around a person's wrist or arm (or around a belt buckle or a belt loop) ends 20, 22 then being releasably secured to each other as previously discussed.

Cord 16 may be made of any resilient, windable, flexible material commonly known in the art. Nonlimiting examples of materials suitable for cord 16 include fine rope, thread (bundled or unbundled), fishing line, or other polymeric material such as nylon line. Cord 16 may have a length from about 0.15 m (6 inches) to about 3 meters (10 feet), or from about 0.3 m (1 foot) to about 1.5 m (5 feet), or any length therebetween. Cord 16 may have a diameter (or thickness) from about 0.1 mm to about 10 mm, or about 0.5 mm to about 5.0 mm, or any diameter therebetween.

Second end 24 of cord 16 may be attached to second wristband 18. In an embodiment, second end 24 may be permanently attached to wristband 18 as shown in FIG. 1. Nonlimiting examples of suitable permanent attachment configurations between end 24 and wristband 18 include rivet, sewn, stitched, buttoned, and adhesive attachment.

In another embodiment, second cord end 24 may include a fastening device 32. Fastening device 32 may be adapted to provide releasable attachment between second cord end 24 and second wristband 18 in any manner previously discussed. As shown in FIG. 2, fastening device 32 may be a band 34 that may be wrapped around wristband 18, band 34 having ends 36, 38 that releasably secure to each other in any manner previously discussed herein. Band 3A may be made of any flexible, durable material as is commonly known in the art.

In another embodiment, fastening device 32 may be a buckle 40, with second wristband 41 having a plurality of holes 42a, 42b, 42c, 42d, and 42e as shown in FIG. 2A. Although FIG. 2A shows wristband 41 with six holes, one of ordinary skill in the art will understand that the number of holes may be varied as desired. Buckle 40 may fasten to one or more holes 42a-e in a belt-and-buckle manner as is commonly known in the art. Buckle 40 and holes 42 also advantageously permit precise sizing of wristband 18 around the wrist of a person, such as a person with a small arm or wrist, for example. Buckle 40 and holes 42a-e enable wristband 41 to be snugly secured around a person's wrist, preventing the person's hand from slipping through wristband 41. This precision sizing provided by buckle 40 and holes 42a-e is particularly advantageous when it is desired to tether a rambunctious child or a child that has the uncanny ability to slip out of a caretaker's grip or otherwise to remove himself from adult supervision.

In an embodiment, fastening device 32 may be a clasp 44 that hooks into a hole 46 of wristband 48 as shown in FIG. 2B. Once clasp 44 is placed through hole 46, the clasp closes upon itself to provide a rigid, enclosed loop around a portion of wristband 48. Clasp 44 is openable enabling releasable attachment to hole 46 as is commonly known in the art.

In an embodiment, a kit 50 is provided, kit 50 including a first wristband 52 with retracting mechanism 14 releasably attached thereto, and a plurality of alternate wristbands 54, 56, 58, and 60 as shown in FIG. 3. First wristband 52 may be interchanged with, replaced by, or otherwise substituted with any of alternate wristbands 54, 56, 58, and 60. Each alternate wristband may include a feature, a trait, a quality, or a property that is different than a feature of first wristband 52. The wristband feature may be color, size, shape, length, material, visual appearance, and any combination thereof. For example, first wristband 52 may be one color, each alternate wristband being a color different than the color of the first wristband. Or, one or more alternate wristbands may vary in material, length, size, shape, or visual appearance when compared to first wristband 52.

Kit 50 may also include alternate wristbands that may be interchangeable with second wristband 18. In an embodiment, first wristband 62, worn by an adult, may have the same visual appearance as second wristband 64, worn by a child as shown in FIGS. 3A and 3B. In a further embodiment, first wristband 66, worn by an adult, may be a made of a first material and a first color and second wristband 68, worn by a child, may be a second color and be made of a second material as shown on FIGS. 3C and 3D. Thus, wristbands may be changed, substituted and interchanged with alternate wristbands depending a person's preference for visual appearance, one's desire to match the wristband with one's wardrobe, and/or one's desire to match the wristband to one's personality. Non-limiting examples for the interchangeability of the wristbands include a pink VELCRO® wristband for a girl, a black cloth wristband for a father/man, a white leather wristband for a mother/woman, and a blue rubber wristband for a boy.

In an embodiment, retracting mechanism 70 may be rotatable about an axis B that is perpendicular, or substantially perpendicular, to a front face 71 of retracting mechanism 70 as shown in FIG. 4. A post 72 may secure retracting mechanism 70 to attachment member 74, enabling the retracting mechanism to rotate about axis B. Attachment member 74 may be releasably attached to band 73 as previously discussed. Axis B may also be considered to be perpendicular to, or substantially perpendicular to, attachment member 74 or the upper surface of a person's wrist as shown in FIG. 4. This permits a broad range of motion for persons tethered with device 10. Arrows C indicate that cord 16 has wide freedom of motion, cord 16 being movable 360° about or around axis B. FIG. 4 also shows another embodiment for fastening device 32. Fastening device 32 may be a flexible band 76 with a snap 78 providing second end of cord 16 with releasable attachment to the second wristband.

Figure 5:
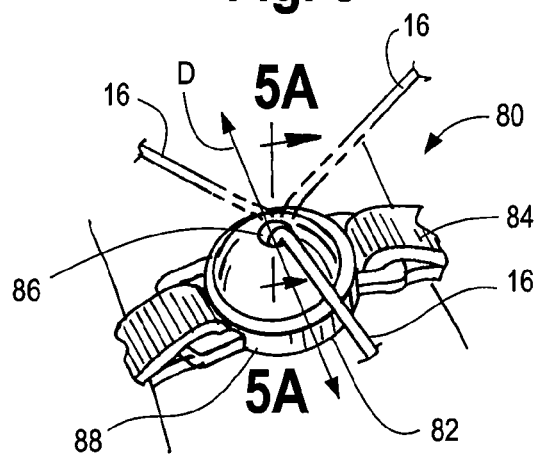
FIG. 5 is a fragmentary perspective view of an alternate embodiment of a retracting mechanism in accordance with an embodiment of the present disclosure.
Figure 5A:
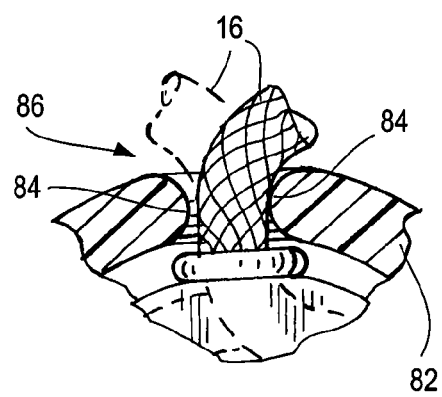
FIG. 5A is a sectional view of the retracting mechanism taken along line 5A-5A of FIG. 5.

In an embodiment, tether device 80 may include retracting mechanism 82 attached to band 84, retracting mechanism 82 having a cord opening 86 that is parallel to axis D, axis D being perpendicular to, or substantially perpendicular to, attachment member 88. Axis D may also be considered to be perpendicular to, or substantially perpendicular to, the upper surface of a person's outer wrist when device 80 is worn on a person's wrist. In other words, opening 82 may be located on an upper surface or an upper face of retracting mechanism 82. Opening surface 84, shown in FIG. 5A, may be rounded, smoothed or otherwise beveled permitting smooth ingress and egress of cord 16 through opening 86. Opening 86 provides cord 16 to have a 360° range of motion about axis D as shown in FIG. 5.

In an embodiment, a tether system 100 is provided. System 100 includes a first wristband 102 having a retracting mechanism 104 attached thereto, wristband 102 secured to the wrist of a first person 106. A first end of cord 108 may be attached or otherwise operatively connected to retracting mechanism 104. Second end 110 of cord 108 may be attached to second wristband 112 in any manner as previously discussed by way of fastening device 111. Second wristband 112 may be attached to the wrist of a second person 114. Retracting mechanism 104 may retract (arrows E of FIG. 6) and extend (arrows F of FIG. 7) cord 108 in response to changes in distance between first person 106 and second person 114. Persons 106, 114 may be an adult, a child, and combinations thereof. In an embodiment, first person 106 may be an adult and second person 114 may be a child as shown in FIGS. 6 and 7. Wristbands may be worn in any manner as desired with retracting member 104 and fastening device 111 being adjacent to any desired wrist portion (i.e., the upper wrist, the back side or underside of the wrist just below the palm of the hand, or either side of the wrist). In an embodiment, wristband 102 may be worn or arranged so that retracting mechanism 104 is adjacent the upper or outer surface of the wrist (similar to the traditional location of a wristwatch) as shown in FIG. 6. In a further embodiment, second wristband 112 may be arranged so that fastening device 111 is adjacent the upper or outer wrist portion. Either wristband 102, 112 may be interchanged or substituted with an alternate wristband as previously discussed.

In an embodiment, the extendible length of cord 108 may be from about 0.3 m (1 foot) to about 2 m (6 feet) or about 0.5 m (1½ feet) to about 1 m (3 feet) or any length therebetween. This enables first and second persons 106, 114 to maintain a hand-in-hand cooperative engagement. In an embodiment, system 100 may tether or maintain connection between persons 106, 114 when either person has a need to use one or both hands (i.e., purchase of an item, shifting of an item from one hand to another, retrieving an item, etc.). After the need for hand use has passed, persons 106, 114 may return to a hand-in-hand engagement with relative ease, system 100 invoking little or no obstruction between persons 106, 114.

In an embodiment, tether system 118 may include retracting mechanism 120 attached to wristband 122 worn by first person 124 as shown in FIG. 1. The second cord end of cord 126 may be attached to a second retracting mechanism 128, second retracting mechanism 128 being attached to second wristband 130, worn by person 132. Second retracting mechanism 128 may be attached or releasably attached to second wristband 130 in any manner as previously discussed. In an embodiment, second retracting mechanism 128 may provide additional extension of cord 126 (i.e., additional length of cord 126) as shown by arrows F of FIG. 7. In an embodiment, cord 126 may be extendible to about 1 m (3 feet) to about 1.5 m (10 feet) or any length therebetween, enabling persons 124, 132 to be separated and tethered by a distance from about 0 feet to about 10 feet as shown in FIG. 7. The retracting mechanisms of systems 100, 118 may be any retracting mechanism as previously described herein. Wristbands 122, 130 may be interchangeable with alternate wristbands as previously discussed.

In an embodiment, a housing 134 may be disposed around retracting mechanism 120. Housing 136 may also be placed around second retracting mechanism 128 as shown in FIG. 7. Either housing may include an ornament. Nonlimiting examples of suitable ornaments may include a watch (such as watch 138 located in housing 134), a toy, a video game, a compass, jewelry, an aesthetic design, a stone, or an image of a popular cartoon character or action figure, such as FIG. 138 of Mickey Mouse in FIG. 7.

Figure 8:
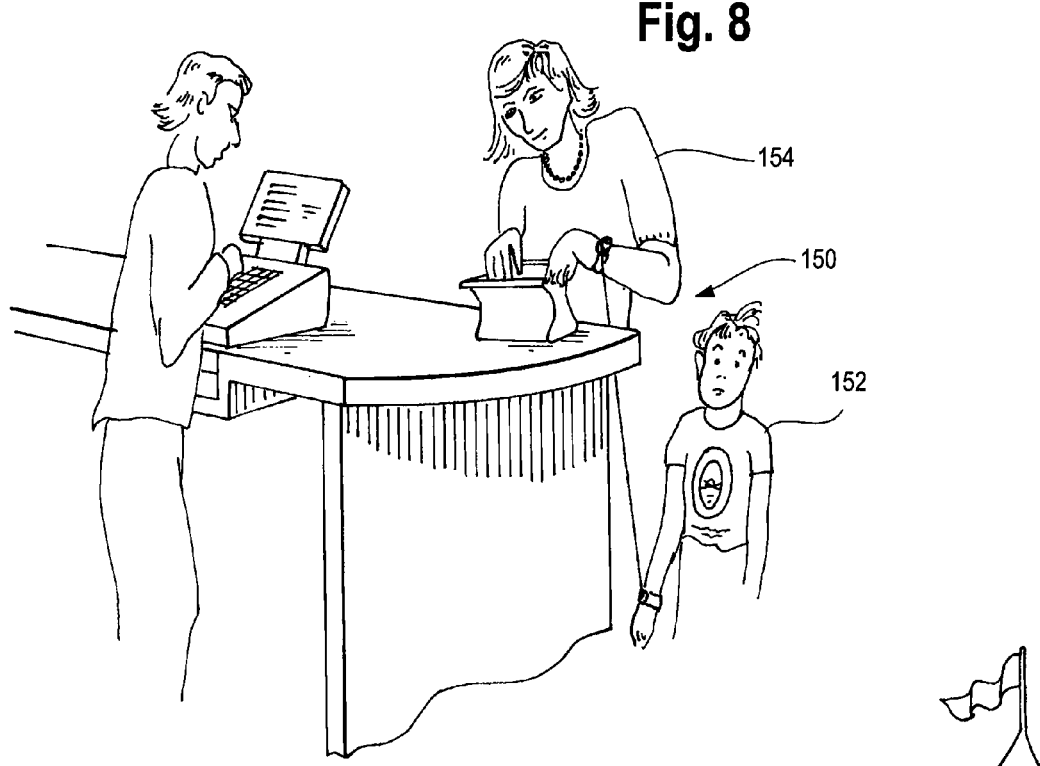
FIG. 8 is a perspective view of a tether system in accordance with an embodiment of the present disclosure.

The tether device and tether systems described herein advantageously provide a convenient, inconspicuous, safe, and socially acceptable approach to undertake public excursions in the company of small children. The devices and systems disclosed herein are particularly well-suited to tether young children in situations where an adult or caretaker requires use of his or her hands. FIG. 8 illustrates a nonlimiting situation whereby tether device 150 (which may be any tether device or tether system as previously described) maintains child 152 in close proximity to caretaker 154 while caretaker 154 uses her hands for a brief period to retrieve money from her purse in order to make a purchase. Tether device 150 provides extension of the cord enabling caretaker 154 to use both hands to attend to the transaction, while simultaneously providing a physical connection between caretaker 154 and child 152. In other words, system 150 provides hands-free restraint of child 152. The small burden imposed upon child 152 by tether device 150 is more than offset by the security of keeping child 152 in close proximity to caretaker 154 in a public place (such as a store, for example) when caretaker 154 is occupied. Tether device 150 also reduces worry and fear caretakers and parents experience when traveling to public places with small children. Tether device 150 provides piece of mind to caretaker 154 in the brief moments caretaker's 154 attention is drawn elsewhere and/or caretaker 154 requires brief use one or of both hands. Once the business of caretaker 152 is complete, caretaker 152 may return to hand-in-hand guidance of child 152. When child 152 is held by the hand, tether device 150 retracts the cord (as previously discussed) making tether device 150 nearly indiscernible by onlookers-thereby removing the negative social stigma commonly attached to child restraint devices.

In an embodiment, tether device 150 (or any tether device or tether system disclosed herein) may have a weight from about 10 g to about 100 g or about 25 g to about 50 g or any weight therebetween. Tether device 150 thereby provides a lightweight, non-obstructive device to assist a caretaker or parent in the safe escort of children in public. The light weight nature of tether device 150 in addition to the previously discussed embodiments-releasable attachment, band interchangeability, the limitless variations in the visual appearance of the tether device that are possible, and ornaments- yields a tether device that is fan and attractive to children. This attractiveness promotes acceptance and use of the tether device by children.

Figure 9:
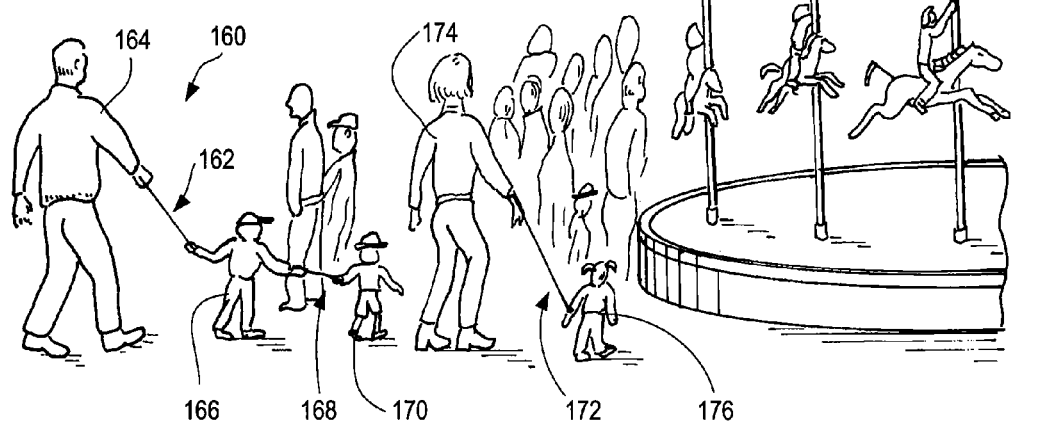
FIG. 9 is a perspective view of a tether system in accordance with an embodiment of the present disclosure.

In an embodiment, tether system 160 may used to tether or otherwise connect two or more persons as shown in FIG. 9. Tether device 162 may connect person 164 to person 166. Tether device 168 may connect person 166 to person 170. Tether devices 164 and 168 may be any tether device and/or tether system as previously discussed herein. Persons 164, 166 and 170 may be adults, children, and combinations thereof. In an embodiment, person 164 may be an adult, person 166 may be a child, and person 170 may be a second child as shown in FIG. 9. Alternatively, a single caregiver (such as an adult) may use two tether devices (i.e., one tether device secured on each of the adult's wrist) to tether or otherwise restrain two or more children. Tether system 160 thereby enables a caregiver and multiple children to negotiate a public place (such as an amusement park) safely and in close proximity with each other. Tether device 172 may be used to connect or otherwise tether person 174 and person 176 as previously discussed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A child tether device comprising:
a first wristband made of a flexible and resilient material and having a fastening member releasably attachable to a reciprocal fastening member for snugly securing the first wristband as a closed loop around a person's wrist, the first wristband attached to a first housing containing a first retracting mechanism, and, the first retracting mechanism comprising a first spool assembly, a first end of a windable cord attached to the first spool assembly; and
a second wristband made of a flexible and resilient material and having a fastening member releasably attachable to a reciprocal fastening member for snugly securing the second wristband as a closed loop around the child's wrist, the second wristband attached to a second housing containing a second retracting mechanism, the second retracting mechanism comprising a second spool assembly, and a second end of the cord in operative communication with the second retracting mechanism;
the cord winding upon the spool assemblies to maintain a two-direction and constant biasing force on the cord, the retracting mechanisms permitting retraction and extension of the cord responsive to changes in the distance between the person and the child, the retracting mechanisms retracting the cord to a length of 0 feet between the first wristband and the second wristband, the cord is concealed to onlookers when the first person and the child are hand-in hand;
the cord having a thickness from 1.0 mm to 5.0 mm and composed of a material selected from the group consisting of fine rope, thread, fishing line, and polymeric material; and
the device is a hands-free and lightweight device having a weight from 10 g to 100 g.

2. The child tether device of claim 1 wherein each retracting mechanism imparts an invariable biasing force.

3. The child tether device of claim 1 wherein each retracting mechanism imparts a variable biasing force.

4. The child tether device of claim 1 wherein the retracting mechanisms permit extension of the cord to a length of 3 feet.

5. The child tether device of claim 1 wherein the cord is slack-free when the person and the child are hand-in-hand.

6. The child tether device of claim 1 wherein no obstruction is present between the person and the child at the cord length of 0 feet between the wristbands.

7. The child tether device of claim 1 wherein the device has a weight from 50 g to 100 g.

8. The child tether device of claim 1 wherein the cord is a polymeric material.

9. The child tether device of claim 1 wherein when each wristband is made from a material selected from the group consisting of rubber, an elastic material, a thermoplastic material, and a polymeric material.

10. A method for tethering a child to a person comprising:
providing a tether device comprising:
(i) a first wristband made of a flexible and resilient material and having a fastening member releasably attachable to a reciprocal fastening member, the first wristband attached to a first housing containing a first retracting mechanism, a first end of a windable cord attached to the first retracting mechanism,
(ii) a second wristband made of a flexible and resilient material and having a fastening member releasably attachable to a reciprocal fastening member, the second wristband attached to a second housing containing a second retracting mechanism, a second end of the cord attached to the second retracting mechanism,
(iii) the cord having a thickness from 1.0 mm to 5.0 mm and the cord is composed of a material selected from the group consisting of fine rope, thread, fishing line, and polymeric material,
(iv) the tether device having a weight from 50 g to 100 g;
snugly securing the first wristband around the person's wrist;
snugly securing the second wristband around the wrist of the child;
maintaining, with the retracting mechanisms, a two-direction and constant biasing force on the cord;

permitting, with the retracting mechanisms, retraction and extension of the cord responsive to changes in the distance between the person and the child;

retracting the cord to a length of 0 feet between the first wristband and the second wristband;

concealing the cord to onlookers when the first person and the child are hand-in hand; and hands-free tethering the child to the person.

11. The method of claim 10 comprising extending the cord to a length of 3 feet between the first wristband and the second wristband.

12. The method of claim 10 wherein the first retracting mechanism comprises a first spool assembly, the first end of the windable cord attached to the first spool assembly, the second retracting mechanism comprising a second spool assembly, the second end of the windable cord attached to the second spool assembly, wherein the maintaining comprises winding the cord upon the spool assemblies.

13. The method of claim 10 comprising eliminating, with the 0 feet of cord length, obstruction between the person and the child when in hand-in-hand engagement.

* * * * *